Dec. 23, 1941.  M. EWALD  2,266,748
FRUIT TREATING APPARATUS
Original Filed July 29, 1932    4 Sheets-Sheet 1

Inventor:
Mark Ewald
By Henry P. Floyd
Atty.

Dec. 23, 1941.  M. EWALD  2,266,748
FRUIT TREATING APPARATUS
Original Filed July 29, 1932  4 Sheets-Sheet 2
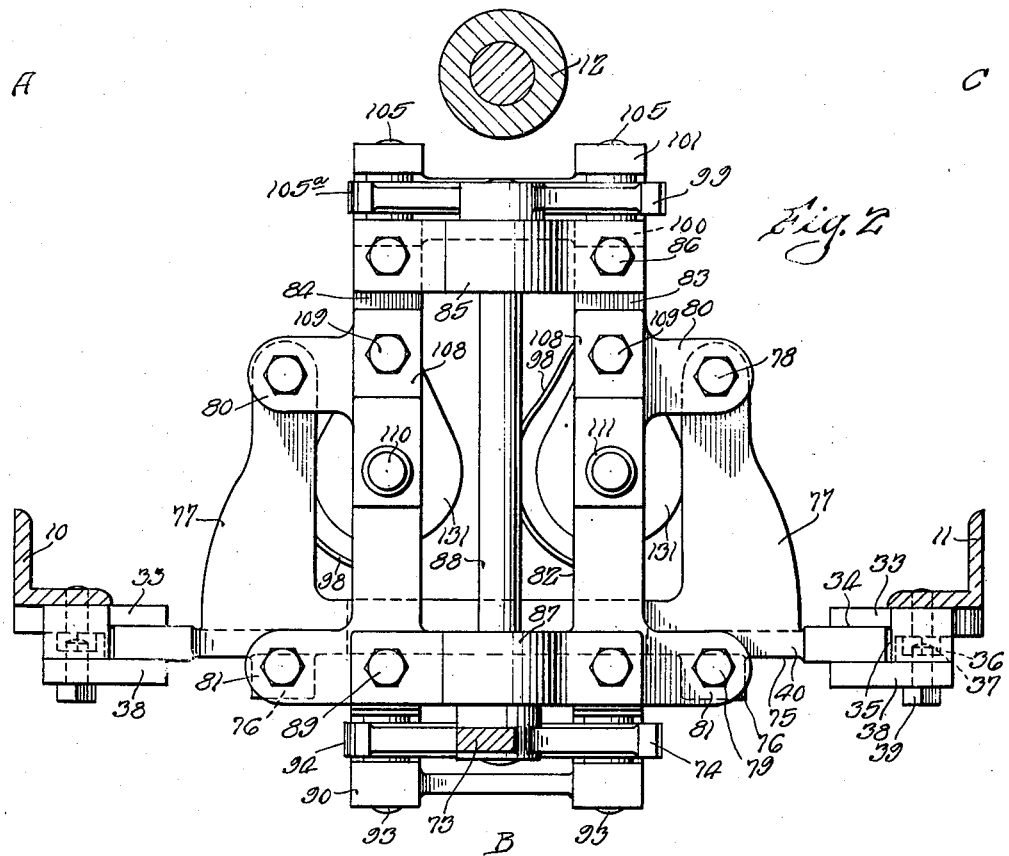
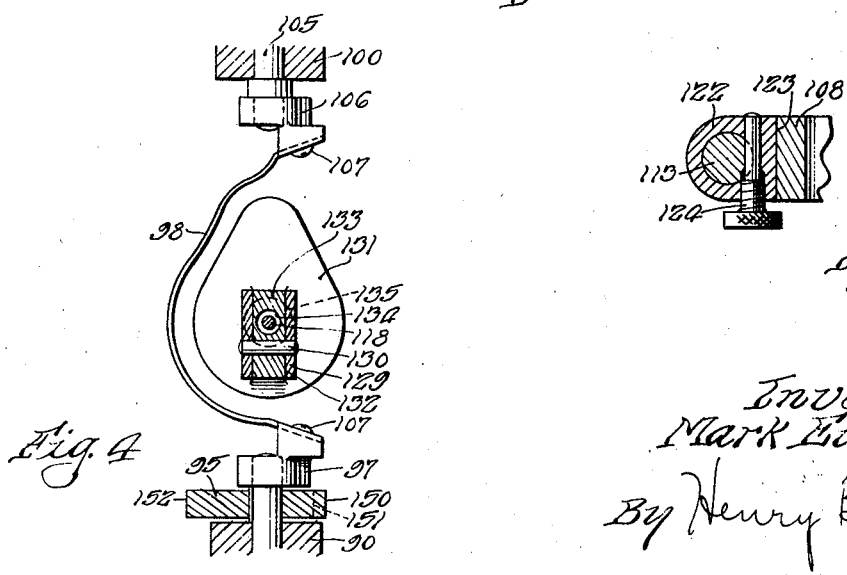
Inventor:
Mark Ewald
By Henry B. Floyd
Atty.

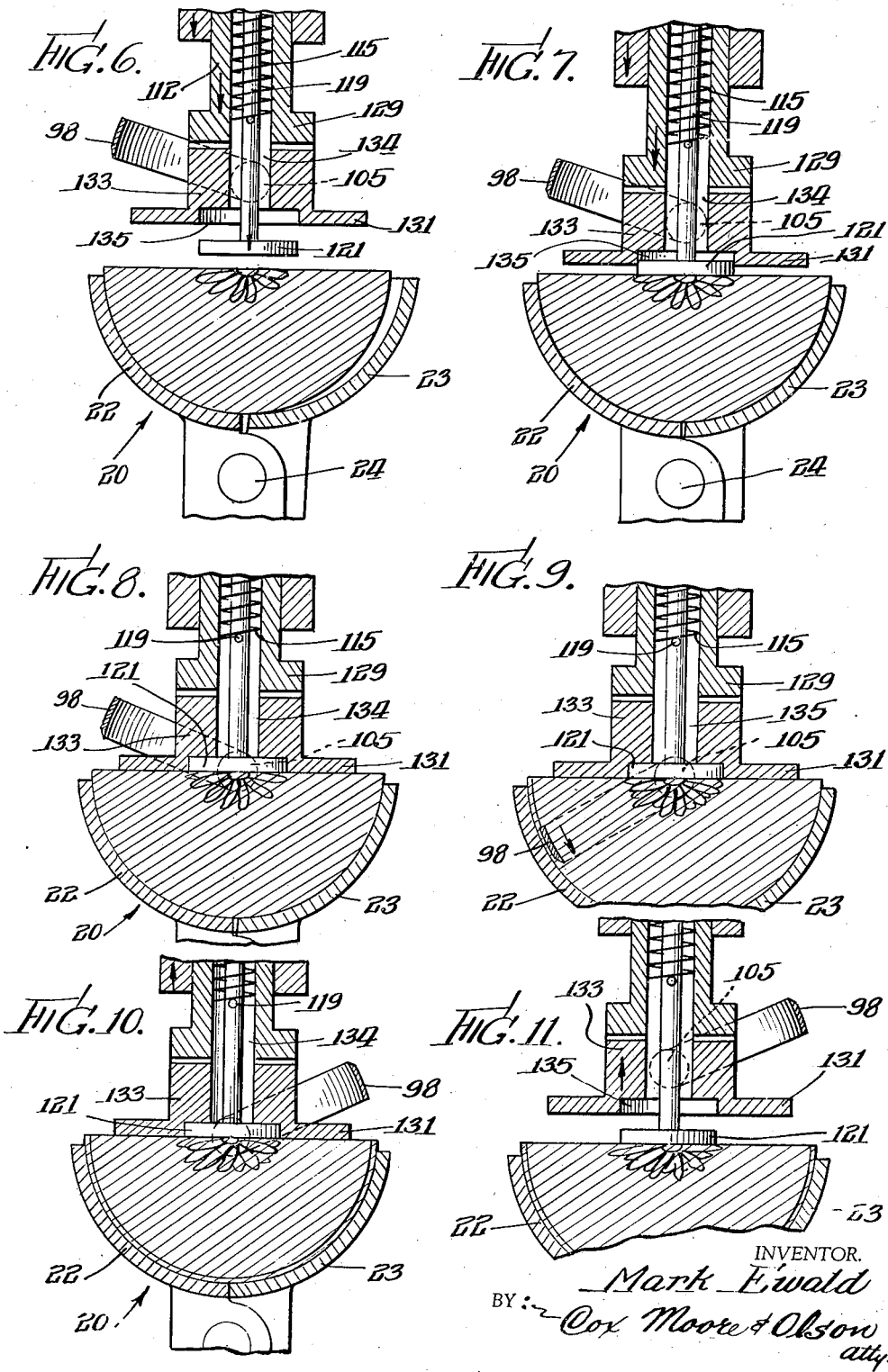

Patented Dec. 23, 1941

2,266,748

UNITED STATES PATENT OFFICE 2,266,748

FRUIT TREATING APPARATUS

Mark Ewald, Olympia, Wash., assignor to Special Equipment Company, Portland, Oreg., a corporation of Oregon Application July 29, 1932, Serial No. 625,851
Renewed July 29, 1939

35 Claims. (Cl. 146—43)

This invention relates to an apparatus for cutting fruit and for properly holding the same to permit of a predetermined and efficient cutting operation.

The invention, in certain aspects, relates broadly to the cutting of fruit including particularly half fruit, and in certain other aspects the invention relates particularly to the peeling of fruits including half fruits. The fruit holding means in certain aspects of the invention is adaptable for not only the cutting as well as peeling of half fruits, but also for whole fruits. The mechanism herein illustrated is especially adaptable for the peeling of half fruit. I have illustrated and described the invention as applied particularly to a type of apparatus disclosed and claimed in other pending applications and/or patents heretofore filed by me, but it is to be understood that the invention is not limited to such adaptations, since the same are illustrative. The generic and specific features of my invention are applicable to other types and arrangements of apparatus for accomplishing substantially the same result in substantially the same manner.

Among the objects of my invention are to provide an apparatus for cutting fruits, especially half fruits, wherein a plurality of fruit holding means is provided for engaging the curved portions of the half fruit, and wherein complemental fruit holding means is provided for engaging the plane face of the half fruit; there being provision for yieldingly mounting the fruit holding means during the cutting, and particularly during the peeling of the fruit, whereby a most accurate cutting of the fruit is attained despite variations both in shape and in size of the fruit; to provide yieldable holding means for the fruit cooperating with cutting means for the fruit which are relatively movable to permit the confinement and discharge of fruit and to permit the cutting operation, and wherein accuracy, durability, and ease of operation are ensured; to provide an improved type of fruit holding means including a plurality of relatively movable members, and especially including relatively movable members having complemental faces adapted to lie in a common plane and successively movable both into contact with the surface of the fruit and/or out of contact with the surface of the fruit, not only for in some instances effecting the discharge of the fruit, but also to provide a fruit holding device of more general adaptations and better to cooperate with cutting means, and particularly with peeling means, whereby a more effective peeling and cutting may be secured.

In my Patents Nos. 1,987,611, issued January 15, 1935, 1,989,090, issued January 29, 1935, and 2,210,909, issued August 13, 1940, on applications co-pending with the present application I disclosed fruit treating machines including mechanisms for peeling fruit halves, particularly half pears. In the machines disclosed in said patents, the peeling mechanism is secured rigidly to the machine frame. Within the frame is a turret carrying fruit-holding cups and adapted to dispose the cups successively and by intermittent motion beneath the peeling mechanism. While the cups are so alined with the peeling mechanism, they are elevated to engage the fruit therein with the peeling mechanism to have the peel removed. The fruit-holding cups are reciprocally mounted in the turret upon stems in vertical bearings and due to wear upon the stems and bearings there is in time a certain amount of looseness developed in the support of the cups so that the peeling blades may not properly aline with the cups unless adjustments are frequently made.

In my co-pending application, Serial No. 636,447, entitled Fruit treating apparatus, filed October 6, 1932, claims are included to the combination of fruit treating units which form a complete fruit treating machine of which the peeling mechanism disclosed in the present application is a part.

For a more detailed description of the construction of the fruit receptacles or cups shown in the present application, reference should be had to my co-pending application, Serial No. 201,413, entitled Fruit treating device, filed April 11, 1938, as a division of my application Serial No. 636,-447, above noted, and as a continuation in part of my application Serial No. 63,019, filed February 8, 1936, as a continuation of application Serial No. 627,549, filed August 5, 1932. Claims to the cup structure and their mounting and operating means are presented in said application Serial No. 201,413.

Claims to the process of making the peeling knife disclosed in the present application are contained in my Patent No. 2,060,802, issued November 17, 1936, on an application Serial No. 711,354, filed February 15, 1934.

Article claims to the peeling blade or knife disclosed in the present application are contained in my Patent No. 2,123,187, issued July 11, 1938, on an application Serial No. 750,151, filed October 26, 1934.

Claims to the peeling process disclosed in the present application are contained in my copending application Serial No. 750,152, filed October 26, 1934.

It is an object of the present invention to provide a peeling mechanism for a fruit treating machine whereby the fruit cups for coacting with the peeling knives may be immovably attached to the turret to preclude any disalinement of the cups and peeling machinism which may otherwise occur due to wear between the reciprocable cap stems and their bearings.

Another object of the present invention is to provide a series of holding means, preferably in the form of cups, adapted intermittently to move in a single horizontal plane to a cutting station, and wherein a cutter head is adapted slidably to move in a vertical plane and at right angles to the movement of the holding means, the cutting head carrying a cutter adapted to form a cut in the cut face of the halved fruit held in the holding means and wherein the cutting head is provided with complemental fruit holding means adapted to yieldingly engage the cut face of the halved fruit whereby not only to position the halved fruit in the holding means but also to hold the halved fruit thus positioned in the holding means during at least a portion of the cutting operation; to provide a device in accordance with the foregoing wherein the complemental holding means is yieldingly mounted upon the cutting head and is adapted to resiliently position the halved fruit prior to the cutting operation, and also to resiliently hold the halved fruit during at least a portion of the cutting operation; to provide a fruit treating apparatus wherein a halved fruit is held in a suitable holding means and wherein a cutting head is moved with a straight line motion downwardly directly onto the held fruit to cut into the cut face of the halved fruit, and wherein additional spring-pressed means mounted on the cutting head serves to engage the cut face of the halved fruit not only to position the same prior to cutting but likewise also to comprise the sole means for holding the halved fruit during at least a portion of the cutting operation.

Another object of the present invention is to provide a movable yoke as a base for a fruit peeling mechanism so that said mechanism may be carried into a selected position to act on a fruit in a stationary cup.

Another object of the present invention is the provision of a reciprocal base for a pear peeling mechanism and with an extended bearing surface for reducing the displacement of the base because of any wearing of the bearing surfaces.

Other objects of the present invention include the provision of:

A peeling mechanism with a curved blade adapted to remove the peeling from a halved fruit with but a single movement.

Means affiliated with a peeling mechanism for pressing a fruit into a fruit cup concurrently with the peeling operation of said fruit.

A knock-out pad as an auxiliary member to a peeling pad for holding a fruit within a fruit cup, and for preventing the fruit from sticking to the peeling pad.

These, and other desirable objects of the invention are obtained by the novel arrangement, unique combination and improved construction of the various elements thereof which will be more readily understood by reading the following description in connection with the accompanying drawings, hereby made a part of this specification, and in which:

Figure 2 is a plan view of the pear peeling mechanism shown in Figure 1;

Figure 4 is a fragmentary sectional view of the present invention taken at the line 4—4 in Figure 3;

Figure 5 is a sectional view of the device taken at the line 5—5 in Figure 3; and Figures 6 to 11 are diagrammatic views illustrating the operation of the mechanism in peeling the fruit.

Identical reference characters are used throughout the following description and in the drawings for identifying similar parts of the invention.

Figure 1:
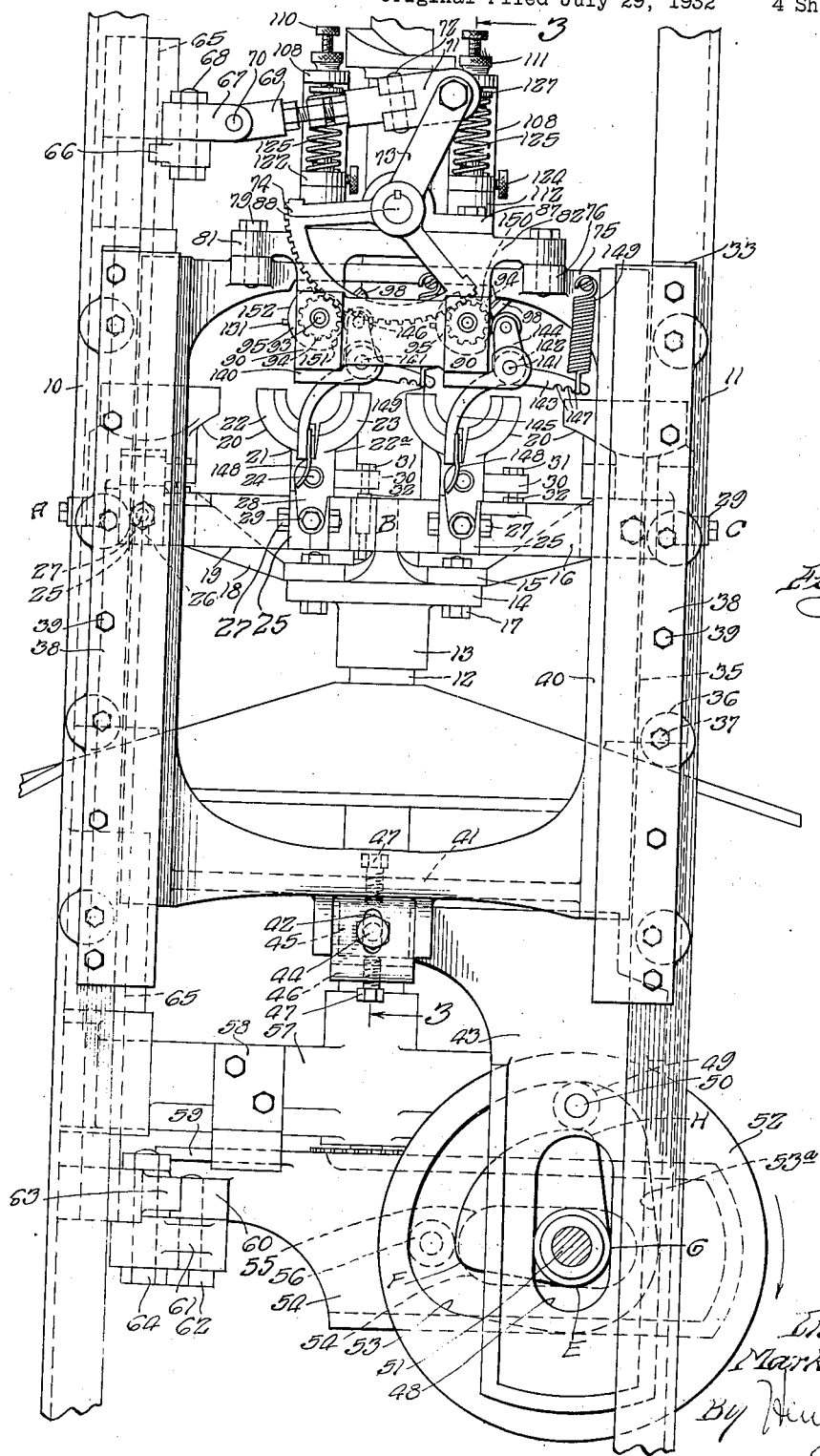
Figure 1 is a side elevation of a pear treating mechanism embodying the present invention.

The fruit treating apparatus of which the present invention is a part comprises a frame of four upright members disposed at the four corners of a rectangle, two of such members, 10 and 11, being shown in Figures 1 and 2. Any suitable number of cross-bars and sidebars may be used for holding the upright frame members 10 and 11 (and the other two similar frame members associated therewith but not shown) in a fixed rigid assembly.

Centrally positioned with reference to the upright frame members of the fruit treating apparatus is a vertical sleeve shaft 12 which is arranged for intermittent rotation. Such shaft is controlled by a Geneva mechanism (not shown). Fixedly attached to the shaft 12 is a collar 13 having a flange 14. Resting upon the flange 14 is a base or hub 15 of a turret 16. The base 15 of the said turret 16 is secured to the flange 14 by means of bolts 17 so that the turret will rotate intermittently with the shaft 12 and collar 13.

A station of the fruit treating mechanism is at each side of the rectangle about which the four upright members heretofore mentioned are placed. Radiating from the hub 15 of the turret 16 are spokes 18 at angles of ninety degrees from one another and directed centrally toward each of the four stations or sides of the apparatus. The spokes 18 terminate in a peripheral rim 19 of the turret.

Fruit holding means comprising four pairs of fruit cups are secured to the rim of the turret, one of each pair being positioned on either side of the point where a spoke 18 enjoins such rim. Each fruit cup 20 comprises a stationary element 21 having cup walls 22 and a movable element 22a having walls 23 and pivoted to the stationary element about a shaft 24 anchored within the stationary element.

The stationary elements 21 have stems 25 extending downwardly therefrom and which have therein a slot 26 through which a bolt 27 may be inserted for engaging the turret rim 19 for holding the cups in place thereto. An arm 28 extends downwardly from each of the movable cup elements 22a and carries thereon a roller bearing 29 in such a manner that the roller bearing may be engaged by certain apparatus, later to be described, for pivoting the movable cup element about an axis in the shaft 24 for closing the cup walls.

The size of the fruit cups 20 may be adjusted by means of arms 30 which project from the movable elements 22a and which contain bolts 31 for screwing against stops 32 in the fruit turret. By screwing bolts 31 downwardly against the stops 32, the movable cup elements 22a will be pivoted about their respective shafts 24 to carry the cup walls 23 in a direction for closing the cups.

Each movement given intermittently to the shaft 12 rotates that shaft. The turret 16 is thus moved through an angle of ninety degrees so that when the pairs of fruit cups 20 are moved they will be shifted from a central position of one side or station of the fruit treating apparatus to a central position of the succeeding side or station. Rotation of the turret 16 is had in a counterclockwise direction as viewed from above the machine.

Secured to each of the upright members 10 and 11 are angle guide plates 33 having faces 34 in a common plane and faces 35 in parallel opposed planes. Distributed along the length of the angle plates 33 are a plurality of countersunk sections 36 having apertures in the bottoms thereof for the reception of bolts 37. The bolts 37 coengage angle plates 33 and the upright frame members 10 and 11 for holding the angle pieces or plates thereto. The countersunk sections 36 are for receiving the heads of the bolts 37 so that flat guide plates 38 may be laid flatly against angle pieces 33 to be there held by means of bolts 39. A portion of each of the guide plates 38 projects into opposed relationship with the face 34 of the angle guide member with which it is assembled to form a track.

Slidably mounted within the track formed between guide plates 33 and 38 is a generally rectangular yoke 40. Depending from the lower body of the yoke 40 is a bracket 41 which may be cast integrally with the yoke. A slot 42 within the bracket 41 having a greater vertical dimension is for engaging an arm 45 of a cam follower 43 by means of a bolt 44.

The arm 45 projects from the cam follower 43 to pass between two lugs 46 of the bracket 41 where it is engaged at both its upper and lower sides by set screws 47. Such screws 47 assist the bolt 44 in holding the bracket 41 in fixed assembly with the arm 45.

The cam follower 43 has in the central portion of its main body a vertical slot 48. Above the slot 48 is a roller bearing 49 which is journalled upon a bolt 50. The slot 48 is traversed by the main camshaft 51 of the device upon which camshaft is keyed a face plate cam 52 into which a groove 53 is cut. On the opposite side of the face plate cam 52 is a groove 53a which exactly coincides with and is congruent to the groove 53 as shown in Figure 1.

A cam follower 54 having an oblong slot 55 operates on the far side of the cam plate 52, Figure 1, and is propelled by roller bearing 56 operating within the groove 53a. Depending from an internal frame member 57 is a guide bracket 58 in which the arm 59 of the cam follower 54 is guided during reciprocation.

An apertured ear 60 upon the arm 59 carries one end of a link 61 by means of a threaded pin 62. The opposite end of the link 61 is shackled to the extended end of an arm 63 through the agency of a pin 64. Suitably journalled within the angle of the upright frame member 10 is a shaft 65 to which one end of the arm 63 is fixedly attached.

An arm 66 is attached to the upper end of the shaft 65 to rotate therewith as the latter is propelled by the arm 63. The extended end of the arm 66 pivotally carries a clevis member 67, the member 67 being attached to the arm 66 by means of a bolt 68. One end of an adjustable link 69 is pintled within the clevis 67 by a pin 70. The opposite end of the adjustable link 69 pivotally engages a head 71 by means of a pin 72. Head 71, in turn, pivotally engages an end of an arm 73 which extends upwardly from a segmental gear 74.

Projecting forwardly from the top cross piece 75 of the yoke 40, Figure 1, are lugs 76. Extending backwardly in the opposite direction of the lugs 76 from the cross member 75 are arms 77. The arms 77 and lugs 76 are apertured and threaded for the co-reception of bolts 78 and 79 with arms 80 and 81 which extend from a generally rectangular frame member 82. The frame member 82 as a part of the present device has two identical side pieces 83 and 84.

Commonly carried by the side pieces 83 and 84 at their innermost end is a bearing block 85 which is enjoined thereto by means of bolts 86. At the opposite end of the frame 82 is a bearing block 87 containing a bearing commonly alined with the bearing within the bearing block 85. Within the two bearing blocks 85 and 87 is rotatively carried a shaft 88. Bolts 89 secure the bearing block 87 in place.

Depending from the outer edge of the frame 82 are pieces 90 which contain bearings 91 and 92. Within the bearings 91 and 92 are journalled shafts 93 to which, in turn, are connected pinions 94 for engaging the segmental gear 74. Back of the pendant members 90 and upon the shafts 93 are carried cams 95 which rotate with the shafts. Beyond the cams 95 and attached to the shafts 93 by means of set screws 96 to rotate therewith are blocks 97 for the attachment of an end of a paring blade 98. The paring blade 98 is illustrated in Figures 3, 4 and 6 to 11. The longitudinal contour of the blade is shown in Figure 4.

Secured to the inner end of the shaft 88 is a segmental gear 99, Fig. 2, which spans an angle equal to the segmental gear 74 and which is alined axially of the shaft 88 with the said gear 74. Legs 100 extend downwardly from the inner end of the frame 82 to carry upon the lower extremity bearing brackets 101. The brackets 101 may be cast integrally with the legs 100 if desired, but in the present instance bolts 102 are used for fabricating the two members.

Alined bearings 103 and 104 in the brackets 101 and the legs 100, respectively, commonly carry an arbor member 105 to an end of which is secured a head 106 for engaging the opposite end of the blade 98. In Figure 4, it will be noted that screws 107 serve as means for holding the ends of the blade 98 to the two heads 97 and 106.

Rising vertically from each of the side pieces 83 and 84 are Z-shaped brackets 108, the lower foot of the brackets being held to the side pieces by means of bolts 109. The upper ends of the brackets 108 are apertured and threaded for the reception of adjustment screws 110 and lock nuts 111 therefor.

Substantially midway of the two ends of the side pieces 83 and 84 is a vertical bearing 112. The bearings 112 are for reciprocally supporting complemental fruit holding means hereinafter specifically referred to as peeling pads for operating in connection with the peeling blades and the fruit holding cups.

Figure 3:
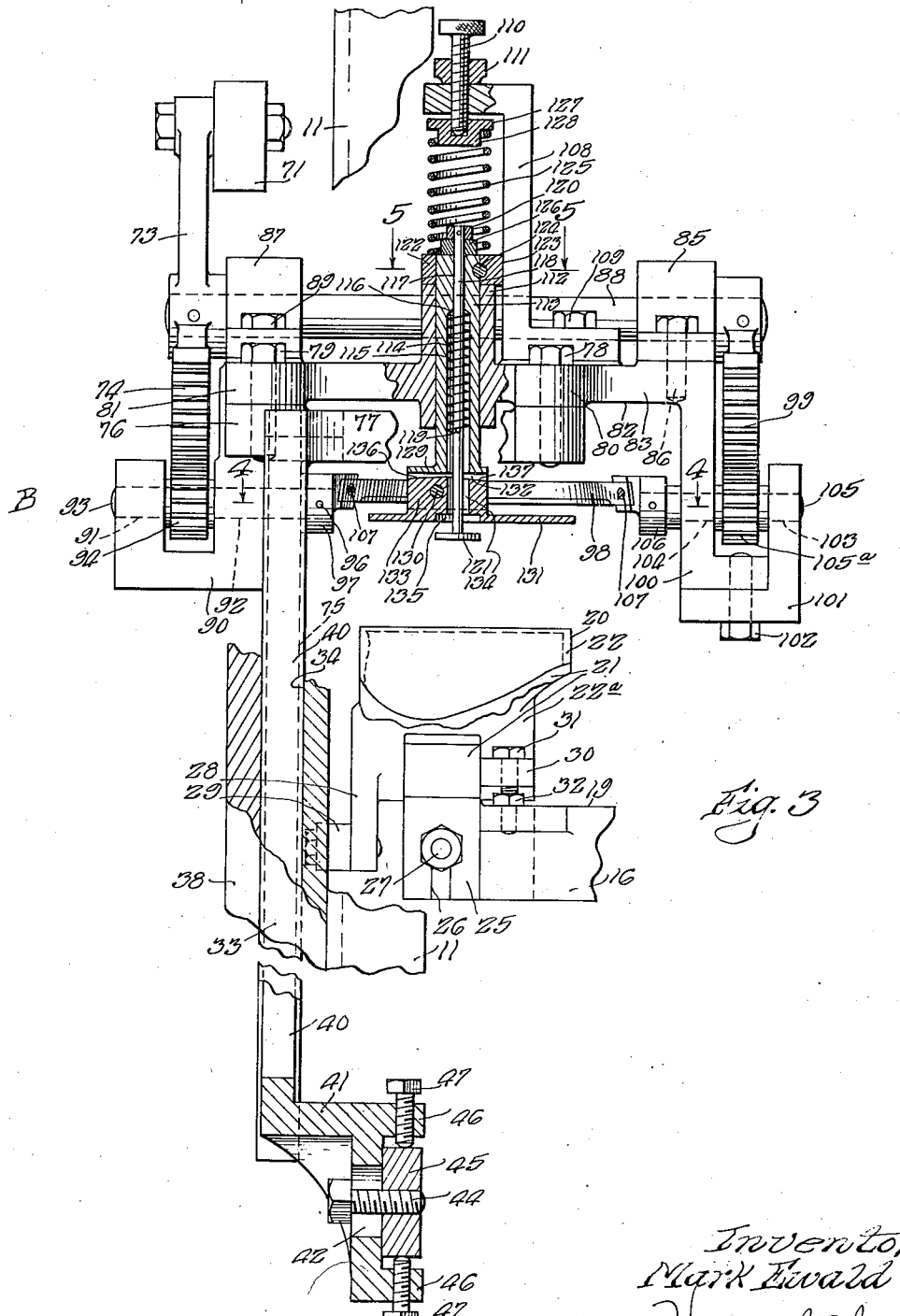
Figure 3 is a sectional elevation of the present invention taken at the line 3—3 of Figure 1.

Since the parts associated with the peeling pads which are carried within each of the bearings 112 are identical, the description will be directed particularly to the mechanism supported in the member 83 shown in Figure 3.

Reciprocally contained within the bearing 112 is a hollow stem or sleeve 113. An enlarged portion 114 of a channel within the hollow stem 113 communicates with the bottom of said stem and carries therein a compression spring 115. The upper end of the spring 115 abuts against a shoulder 116 which is between the enlarged section 114 and the smaller section 117 of the channel within the stem 113.

The rod 118 extends throughout the length of the hollow stem 113 and has its bearing surface within the channel section 117. A pin 119 inserted through the rod 118 is compressingly engaged by the lower end of the spring 115 so as to urge the rod 118 downwardly as is limited by a collar 120 secured to the upper extremity of the stem.

Upon the lower end of the reciprocal stem rod 118 is a suction breaking or knock-out pad 121. Enjoining the upper end of the hollow stem 113 is a stop collar 122 having a flat side 123 (see Figure 5), for sliding along the adjacent face of the bracket 108 as the stem 113 is reciprocated. A thumb screw 124 co-transgresses the stem 113 and the collar 122 in the manner shown in Figures 3 and 5 for the purpose of retaining the collar upon the end of the stem. By the engagement of the flat face 123 with the Z-bracket 108, a selected radial position of the stem 113 is maintained.

Constantly urging the channelled stem 113 to the lower extent of its reciprocal limits as determined by the stop collar 122, is a compression spring 125 which is held from sliding from the top of the stem 113 by means of a collar 126 circumadjacent to the stem 118. The upper end of the compression spring 125 presses against the flange 127 of a circular boss 128. The boss 128 may be enjoined to the lower end of the thumb screw 110 in any standard manner.

At the lower end of the reciprocal stem 113 is a channeled head 129. Sides of the groove 129 are apertured for the common reception of a pin 130 which pivotally holds a peeling pad 131. The pin 130 is disposed closer to one end than to the other, so that the pad is mounted off center. The plan contour of the peeling pad 131 is not unlike that of the flat face of a pear severed centrally and longitudinally. Such contour of the peeling pad 131 is shown in Figure 4.

A boss 133 projects from the upper face of the peeling pad 131, said boss carrying the pin 130. Arranged vertically within the boss 133 and the peeling pad 131 is a channel 134 which registers with the channel within the stem 113 thereabove. The portion of the channel 134 within the peeling pad 131 is countersunk at 135 in a manner enabling it to receive the knock-out pad 121 so that the latter, when seated therein, will reach flush with the lower face of the peeling pad.

In Figure 3, the upper face of the boss 133 is shown as tapered in either direction from a point above the pin 130 downwardly toward the two edges 136 and 137. The inclined face sections within the upper face of the lug 133 limit the rotation of the peeling pad 131 about the axis within the pin 130 by abutting alternately with the ceiling of the groove 132.

In Figure 1, there is shown attached to the bottoms of the members 90 bearing brackets 140 into which are screwed bolts 141 to serve as bearings for a sleeve 142 from which radiate arms 143, 144 and 145. Each arm 144 carries a roller bearing 146 which rolls along the peripheral edge of the cam 95 adjacent thereto. Within the lower edge of the arms 143 are formed a series of notches 147. Arms 145 carry leaf springs 148 to project beyond the lower ends thereof. Contraction springs 149 connect the ends of the arms 143 to the cross member 75 of the yoke 40 and constantly urge the sleeves 142 to turn in a counter-clockwise direction as seen in Figure 1 whereby to press the roller bearings 146 against their respective cams 95. The springs 148 are carried in a vertical plane common to the roller bearings 29 so that the springs roll along said bearings when the yoke 40 is lowered.

In Figure 2, the letters A, B, C and D, are representative of four stations about the fruit treating apparatus and at which different operations are performed upon the fruit. At station A, the halved fruit is deposited within the fruit cups which are at that station in a manner to expose the severed face thereof upwardly. When the fruit turret is given a rotation in a counter-clockwise direction, the fruit so deposited within the fruit receptacles is advanced to station B, where the fruit is peeled in the present device.

Thereafter, and by the succeeding intermittent motion imparted to the fruit turret, the peeled fruit and peel which remains within the cup are advanced to station C, where mechanism for coring the fruit removes the core therefrom. The coring mechanism (not shown), subsequent to severing the core from the fruit, abducts the fruit from the fruit cups in a manner leaving the peel within such receptacle.

The next intermittent motion of the fruit turret delivers the cup containing the peel to station D, where other mechanism (not shown) removes the peel from the receptacles. After the operations to be performed at station D have been performed, the cycle to be enacted by that pair of cups is completed and a new cycle is then commenced by the movement of the turret to deliver the scavenged cups to station A.

The peeling mechanism when operating upon the fruit within the receptacles at station B, is lowered by the yoke 40. In Figures 1 and 3, the yoke 40 is elevated and the peeling mechanism is thereby supported above operating range of the fruit cups 20. The face plate cam 52 is rotated by the shaft 51, which is in turn rotated by a prime mover (not shown) in a clockwise direction, Figure 1.

The segmental gear 74 is shown in Figure 1 at the most clockwise of its oscillating limits while the roller 56 is shown in its left-most position. Incident to a continued rotation of the cam 52 in a clockwise direction the segmental gear 74 will be rotated in a counter-clockwise direction by the roller 56 and the intermediate linkages including the vertical shaft 65, the roller 56 being moved to the right. When the roller 56 has reached a position E within the groove 53a, the left end of the gear train in the segmental gear 74 will have reached a position adjacent to the pinion 94 which is shown to the left in Figure 1.

At this time, the pinion 94 will have been rotated in a clockwise direction to position each peeling blade 98 substantially in a horizontal plane as shown in Figures 4 and 6. The roller 49 will have been reached by the point F at this time and further rotation of the cam plate 52 will lower the roller 49 along the camming surface of the groove 53 between positions E and F to carry the yoke 40 downwardly and to place the peeling pads 131 upon the upwardly exposed faces of the fruit which are in the receptacles 20 therebeneath (see Figure 8).

When the point E of the cam plate 52 shall have reached the roller 49, the roller 56 will have been reached by a point G. With the continued rotation of the face cam 52, and while the roller 56 is traversing the space between points G and H, the cam follower 54 will be displaced to the left thereby to rotate the vertical shaft 65 in a counter-clockwise direction as viewed from above and to turn the segmental gear 74 and the shaft 88 and hence the segmental gear 99 in such a direction as to cause a counter-clockwise rotation of the pinions 94 and 105a.

While the roller 56 is being so displaced to rotate, the segmental gears 74 and 99 and the arbor comprising the shafts 93 and 105 and the paring blade 98 in a counter-clockwise direction to pass within the fruit just beneath the peel thereof (see Figure 9), the roller 49 is maintained at a constant elevation at the lower of its reciprocal limits (Figures 8 to 10) by the side of the groove 53 between points E and G.

When the point H has reached the roller 56, the pinions 94 and 105a will have rotated the paring blade 98 somewhat in excess of one hundred eighty degrees so that the paring blades will have entered the fruit upon one side and completely emerged therefrom at the other side. At this time, the peeling mechanism may be elevated for the point G has reached the roller 49 so that further clockwise movement of the face cam 52 displaces the roller 49 upwardly as the camming surface within the groove 53 between the point G and H is passed thereunder.

When the roller 49 has reached the point H, the yoke 40 and the peeling mechanism will be fully elevated, and the point F will be opposite to roller 56 ready to move said roller to the right by further clockwise movement of the cam 52 and to cause a rotation of the pinions 94 and 105a, and hence the peeling blades attached thereto in the reverse direction preparatory to making a cut in a succeeding fruit.

While the paring blades 98 are being rotated in the reverse, or clockwise, direction in Figure 1, the peeling mechanism is maintained at its upper reciprocal limit (Figure 1) by the roller 49 which is being traversed by the camming surface within the groove 53 between points H and F.

When the peeling mechanism is lowered by the yoke 40 to operate upon fruit within the fruit receptacles therebeneath, the springs 148 press against the left sides of the roller bearings 29 to displace the arms 28 and the cup elements 22a counter-clockwise about the spindles 24 in a manner to bring the cup walls together tightly about the fruit therein. When the peeling mechanism arrives at the position for making a cut through the fruit, the camming surfaces 150 of the cams 95 are being pressed by the roller bearings 146 on account of the urge of the springs 149. The cup walls 23 are then held yieldingly against the sides of the fruit because of the urge of the springs 149. Subsequent to the entering of the blades 98 into the fruit a predetermined distance, it is desired that the cup walls be spread and this is accomplished by the rise 151 in the cams 95 which are movable with the paring blades, such camming surfaces 151 passing under the rollers 146 to rotate the sleeve 142 and hence the arms 145 in a clockwise direction, Figure 1, to displace the springs 148 from the roller bearings 29 and to allow the cup walls to be opened.

The camming surface 152 upon the cams 95 maintain the springs 148 from the rollers 29 against the urge of the springs 149 during the remaining cutting stroke of the blades 98. The springs 149 may be engaged with different notches 147 to increase or decrease the effect of the springs 149 for pressing the springs 148 against the rollers 29, for reasons fully explained in my co-pending application, Serial No. 201,413, to which reference has been previously made. In the said co-pending application, Serial No. 201,413, the reason for releasing the cup walls from the fruit after the paring blades have partly pared the fruit is fully explained.

When the peeling mechanism is lowered for peeling the fruit, the peeling pad 131 is pressed against the top surface of the fruit in a yielding manner by virtue of the spring 125 which urges the peeling pad downwardly. The spring 115 which is much weaker than the spring 125 permits the stem 118 and the knock-out pad 121 to be moved upwardly by contact of the pad 121 with the fruit to set such pad within the recess 135 as the pad 131 moves downward into contact with the fruit (see Figures 6 to 8).

The pad 131 holds the fruit securely within the cup thereunder while the fruit is being traversed by the peeling blade (see Figure 9). Because of the stickiness and viscosity of fruit juice and because of the vacuum which is created between the flat surfaces of the fruit and the peeling pad 131, there is a tendency for the fruit to be lifted from the receptacles when the peeling mechanism is elevated subsequently to having peeled the fruit. It is at this time that the knock-out pad 121 becomes operative. The area of the knock-out pad 121 is so small that the weight of the fruit alone will break any vacuum which will have been created between the surface of the fruit and such knock-out pad so that the fruit will not depend therefrom.

The spring 115, although not of a strength to mutilate the severed face of the fruit when the knock-out pad 121 is brought into engagement therewith as the peeling mechanism is lowered, is of a strength to dislodge the fruit from the fruit pad 131 when the pad 131 is lifted. When the peeling mechanism is elevated from the fruit cups after the fruit has been pared, the knock-out pad 121 first presses the fruit from the peeling pad 131 and thereafter the weight of the fruit loosens the fruit from the pad 121 and the fruit is therefore left in the cups.

Inasmuch as the pad 131 pivots about pin 130, the pad, upon being lowered against the flat face of a fruit contained in a cup, will tilt to lay flatly against the face of the fruit. Were the pad 131 mounted rigidly upon the reciprocating piece 113 and then lowered against a fruit that was not lying level within the cup, one edge of the fruit might be pressed sufficiently to break the fruit cells therein. By providing a mounting permitting the pad to adjust its position to correspond to that of the flat face of the fruit, the force of the spring 125 is distributed on the whole of the face of the fruit and no injury can result thereto.

The cycle of operation is as follows: Initially, the cutting head and pads 121 and 131 move downwardly together, as seen in Figure 6. The spring 115 within the stem 113 is substantially weaker than the spring 125. Normally, the lower surface of the pad 131 is below the center line or axis of rotation of the peeling knife 98 a distance of the order of 7/8 of an inch so as to insure contact with the cut face of the fruit half whether the fruit half be thick or thin, and the small pad 121 normally extends below the pad 131 a distance of the order of ½ an inch. As the cutting head descends to the halved fruit, the small pad 121 contacts the cut face of the fruit. Since the force exerted by the spring on the pad 121 is less than the force exerted by the spring 125 on the larger pad 131, the smaller pad now remains substantially stationary and is accordingly received in the recess 135 of the larger pad 131 as the cutting head continues to move downward, as shown in Figure 7. Both pads now remain substantially stationary while the cutting head moves downwardly relative to the pads to the position shown in Figure 8. This distance of movement of the cutting head relative to both of the pads depends, of course, on the thickness of the fruit half for as is apparent the thicker the fruit the sooner will the movement of the pads be arrested and the greater will be the distance of movement of the cutting head relative to these pads. The peeling or cutting knife now swings through its cutting stroke as shown in Figure 9, after which the cutter head starts to rise as indicated in Figure 10. During the first part of this upward movement of the cutting head both pads remain stationary and keep contact with the surface of the fruit as illustrated in Figure 10.

After the bearing 112 (Figure 3) engages the collar 122, the large pad 131 moves upwardly with the cutting head but the small pad 121 may still remain stationary as illustrated in Figure 11, while the large pad moves upwardly a distance of ½ inch relative to the small pad. During this upward movement of the large pad 131 relative to the small pad 121 the spring 115 acting through the small pad holds the fruit against movement with sufficient force to break the suction created between the relatively large flat surface of the pad 131 and the cut face of the half fruit. When the pad 121 begins to move upwardly the weight of the fruit separates it from this pad.

Adjustment of the pressure which the large pad 131 exerts upon the fruit when the peeling mechanism is in its fully lowered position may be effected by manipulation of the adjusting screw 110 and its lock nut 111 for this adjusting screw determines the tension of the spring 125.

The peeling mechanism disclosed in the present application possesses many advantageous features when compared with the peeling mechanisms described in my Patents Nos. 1,987,611, 1,989,090 and 2,210,909. For example, in my Patent No. 1,987,611, the fruit cups themselves have a vertical movement toward and from a stationary cutter head; the fruit cups have also a bodily, lateral movement; and power actuated means is utilized for reciprocating a control bar to positively move the knock-out pad downwardly onto the center of the fruit during the latter part of the cutting stroke of the peeling blade and also to positively force the knock-out pad out of a common plane with the main fruit holding pad.

The construction of the peeling mechanism disclosed in this application differs in a number of aspects:

The present device comprises a peeling pad and a discharge or anti-vacuum pad seated therein in a manner to operate automatically by means of spring pressure. In addition, the present peeling mechanism moves toward the fruit cups instead of having cups move to the peeling mechanism. The advantage gained by moving the peeling mechanism to cups will become more apparent from a comparison of the two methods of operation.

For the peeling blade to perform its task most efficiently there must be a particularly close alignment of the peeling mechanism with the fruit holding cup. The slightest disalignment noticeably impairs the effectiveness of the peeling operation. When the peeling blade is not in proper registry with a fruit cup there is a tendency for the peel of the fruit to become jammed between the blade and the walls of the cup, thereby causing the blade to enter to a greater depth into the fruit, and a tendency for the paring blade to become jammed when the material of the fruit collects between the blade and the wall of the fruit cup.

Improper registry of the fruit cups and the peeling blade may occur in the machine shown in said patents, for example, Patent No. 1,987,611, after such machine has been in use a certain length of time, for a condition of looseness may develop between the reciprocable stems supporting the movable fruit cups and the respective bearings for the stems. Slight wear between the stems for the cups and the relatively short sleeve-like bearings will permit the cups to become out of registry with the blade of the peeling mechanism. This is due to the fact that the sleeves are short as compared to the distance the cups are supported from the sleeves when the cups are elevated.

The machine of Patent No. 1,987,611, for example, has eight reciprocable stems for supporting the fruit cups on the periphery of the turret. Wear upon these stems is usually not uniform and therefore it becomes necessary to make a separate adjustment for each of the stems when it becomes worn. In addition to wear upon the sides of the cup stems, there is an uneven wear upon the bottoms of these stems where they contact the parts which cause their elevation. Consequently, the cups will be elevated to different levels and the cut made into the fruit to remove peeling will be deeper into the fruit held in some cups than into the fruit held in other cups. Hence it is necessary to make eight separate adjustments, one for each of the eight stems, to cause the cups to be presented at a uniform elevation to the peeling blade.

Furthermore, in the devices of these patents, for example, Patent No. 1,987,611, it is necessary because of the intermittent operation of the turret, to make the stems light to thereby reduce the weight of the turret. The lighter cup stems have a tendency to flex or be deflected from the normal desired position and to follow the movement of the paring blade. Also debris from the fruit collects between the bottom of the reciprocable cups and their lower abutments thereby precluding proper seating of the cups.

None of these difficulties are present in the device of the present application and all such difficulties are overcome by the present device.

In the present device a more extensible bearing surface is conveniently provided for the reciprocably supported peeling mechanism than could be provided in the patented devices of said patents wherein the fruit cups are reciprocably supported upon their carrying turret. Upon referring to the drawings of the present application, it may be observed that the yoke 40 has a bearing surface spread substantially over one entire side of the frame of the machine and therefore a great deal of wear would have to occur before the bearing surfaces would cause any misalignment of the peeling blade with the cups. Since such wear occurs, however, compensation therefor may be effected by a simple single adjustment whereas in the devices of said patents an adjustment would have to be made in respect to the mounting means for each movable cup.

A faster operation may be obtained for movement of the peeling or cutting head may be initiated before the cups come to rest. Also, as the peeling or cutting head and the pads are moved away from the cups the advance of the turret and cups to the next station may be initiated. This is in contradistinction to the machines of said Ewald patents where the turret is completely brought to rest before the cups can be lifted and the cups had to be lowered before movement of the turret could well be initiated.

What is claimed as new and is desired to be secured by Letters Patent of the United States is:

1. In a fruit treating apparatus, a fruit holding instrumentality comprising a hollow stem, support means therefor and within which said stem reciprocates, means yieldingly urging said stem to one of the limits of its path of reciprocation, a pad on an end of said stem and having a recess therein, a second stem reciprocally disposed in said hollow stem and having a knock-out pad at an end, said knock-out pad being adapted to be seated in said recess, and means yieldingly urging said knock-out pad out of said recess.

2. The combination with a fruit receiving cup having an open side, of a peeling mechanism comprising a knife for paring peeling from a fruit in said cup, and a mechanism for closing the open side of said cup, said closing mechanism comprising a base, a sleeve reciprocable in said base, means for urging said sleeve towards one reciprocal limit, a member for supporting a fruit holding plate, a fruit holding plate loosely mounted on said holding member, said plate having an opening in alinement with the opening in said sleeve, a stem reciprocal in said sleeve, a head on said stem, said head being adapted to be seated in the opening in said plate, and means for urging said stem to unseat said head from said plate.

3. The combination with a fruit receptacle for holding a half fruit with the flat face thereof exposed, of a peeling mechanism comprising a base movable toward and away from said receptacle, an arbor in said base, a curved blade having its opposite ends mounted in said arbor, a sleeve reciprocally mounted in said base, means urging said sleeve towards said receptacle, a plate at an end of said sleeve and having an opening communicating with the opening in said sleeve, means for urging said arbor and said plate towards said receptacle, a stem reciprocally mounted in said sleeve and extending into the opening in said plate, a head upon said stem and adapted to be seated in the opening in said plate, and means of less force than the means for urging said sleeve for urging said stem towards said receptacle to unseat said head from the opening in said plate, said head being seatable in the opening in said plate when said head engages the flat face of a fruit in said receptacle incidental to the movement of said arbor and of said base toward said receptacle, said blade being movable about said plate and said head and through said receptacle when said plate and said receptacle are in proximity.

4. In combination, a frame having a vertical track, a turret in said frame, means for imparting intermittent rotary movement in a horizontal plane to said turret, fruit cups on said turret for supporting a half fruit with its flat face exposed, a movable peeling mechanism reciprocable in said track and comprising a knife rotatable on a horizontal axis through said cups, a holding member having a flat face complemental to the exposed face of a half fruit, and a discharge member, said holding member and said discharge member being resiliently mounted in said peeling mechanism, means for arresting movement of said turret in predetermined positions, means for moving said peeling mechanism into registry with said cups one at a time as said turret attains such predetermined position, said means actuating said peeling mechanism moving in synchronism with the movement of said turret, and means for moving said paring knife when a cup and said peeling mechanism are in registry.

5. In combination, a frame having at its side a vertical track, a turret in said frame and rotatable on a vertical axis therein, means for intermittently moving said turret, receptacles on said turret each for supporting a half fruit with the flat face thereof exposed, the receptacles on said turret being registered one after another at a predetermined position relative to said track, peeling mechanism shiftable on said track, means for reciprocating said peeling mechanism toward and away from said registered receptacles one after another, the track guiding said peeling means into a fixed position relative to said receptacles, said peeling mechanism comprising a blade rotatable through a receptacle for paring the peel from a fruit therein, means for rotating said blade, a fruit holding pad for engaging the flat face of the fruit during the rotation of the peeling blade, a discharge pad seatable within said fruit holding pad, and spring means released by the movement of the peeling means away from the receptacle for urging said discharge pad from its seated position in said holding pad to free said holding pad from adhering fruit, and means for synchronizing the movement of said peeling mechanism, of said turret, and of said rotatable blade.

6. In combination, a recessed means for holding a half fruit, cooperative flat-faced holding means adapted to contact the cut face of the fruit including a plurality of fruit contacting members having flat faces and being relatively reciprocable, said members being capable of relative tilting movement.

7. In combination, means for holding a half fruit, including a plurality of flat-faced complemental fruit holding members, means for moving said flat faced members successively into contact with the fruit, said means permitting said members to contact the fruit in a common plane and cutting means for said fruit.

8. In a fruit treating apparatus the combination of means for holding a half fruit along its curved surfaces, a support, means for moving the support and first holding means relatively, means forming a yielding mounting for said support, a complemental fruit contacting member tiltably mounted on said support and adapted to contact the plane face of the fruit.

9. In a fruit treating apparatus the combination of means for holding a half fruit along its curved surfaces, a support, means for moving the support and first holding means relatively, means forming a yielding mounting for said support, a complemental fruit contacting member tiltably mounted on said support and adapted to contact the plane face of the fruit, said complemental holding member having a recess and an additional fruit contacting member adapted in one position to lie substantially in said recess with its fruit contacting face substantially in the plane of said complemental contacting member, fruit cutting means movably mounted on said support, and means for moving said additional member out of the plane of said complemental member.

10. In a fruit treating apparatus the combination of means for holding a half fruit along its curved surfaces, a support, means for moving the support and first holding means relatively, means forming a yielding mounting for said support, a complemental fruit contacting member tiltably mounted on said support and adapted to contact the plane face of the fruit, said complemental holding member having a recess and an additional fruit contacting member adapted in one position to lie substantially in said recess with its fruit contacting face substantially in the plane of said complemental contacting member, cutting means movably mounted on said support, and means for moving one of said two latter members relatively to the other and out of contact with the plane face of the fruit leaving the other member in contact with said plane face of the fruit.

11. In a fruit treating apparatus the combination of a plurality of relatively movable and relatively yieldable means adapted to contact curved portions of a half fruit to hold the same, complemental fruit contacting means adapted yieldingly to contact portions of the plane face of the fruit to hold the same, means providing relative movement between said first and complemental holding means, means for peeling the fruit while so held, and means for varying the holding effect of the first-mentioned holding means relatively to the curved portions of the fruit during the movement of the peeling means, said complemental contacting means remaining in contact with the plane face of the fruit during peeling.

12. In a fruit treating apparatus the combination of a plurality of relatively movable and relatively yieldable means adapted to contact curved portions of a half fruit to hold the same, complemental fruit contacting means adapted yieldingly to contact portions of the plane face of the fruit to hold the same, means providing relative movement between said first and complemental holding means, means for cutting the fruit while so held, and means for varying the holding effect of the first-mentioned holding means relatively to the curved portions of the fruit during the movement of the cutting means, said complemental contacting means remaining in contact with the plane face of the fruit during said cutting.

13. In a fruit treating apparatus the combination of a turret provided with spaced apart fruit holding members each adapted to hold a half fruit with its cut face exposed, means for mounting said turret to permit the same to turn in a substantially horizontal plane, a vertically reciprocable yoke, a cutter mounted on said yoke and pad mechanism mounted on said yoke, said yoke being arranged to carry the cutter and pad mechanism into fruit contacting position when a fruit holder has been advanced into the path of reciprocation of the yoke, means for providing a yielding contact between the pad mechanism and the cut face of the fruit, a knock-out pad resiliently and normally projecting from the pad mechanism in advance of the normal plane of the pad mechanism, said pad mechanism being recessed to permit the knock-out pad resiliently to be pressed into said recess of the pad mechanism upon contact of the knock-out pad and the pad mechanism with the cut face of the fruit, said resilient mounting for the knock-out pad mechanism causing the knock-out pad mechanism to remain in contact with the cut face of the fruit upon the preliminary movement of the yoke away from the cut face of the fruit.

14. In a fruit cutting device, the combination of half fruit holding means, a cutter head shiftable in a vertical plane to and from the holding means, cutting means on said cutter head and adapted to contact the cut face of the held half fruit in one position of the cutter head, power means for actuating said cutter head and said cutting means, and complemental fruit holding means mounted on said cutter head and shiftable relatively thereto and arranged to contact the cut face of the half fruit in advance of the cutting means to hold the half fruit from tilting relatively to the first holding means, when contacted by the cutting means, said complemental holding means yielding upwardly relatively to said cutter head and to said cutting means after contacting the cut face of the half fruit.

15. A device for cutting half fruit, the combination of means adapted to contact the curved walls of the half fruit to hold it, power actuated cutter means movable to cut into the body of the half fruit while so held, and complemental fruit holding means adapted yieldingly to contact the cut face of the half fruit throughout the substantial extent thereof during the entire cutting operation to prevent tilting of the half fruit relatively to the first mentioned holding means and the cutting means.

16. In a machine for peeling half fruit, the combination of means for holding a half fruit by contacting the curved walls thereof, a support shiftably mounted relative to the holding means, peeling means shiftably mounted on the support and adapted when the support and holding means are adjacent each other to be operated to form a line of severance through the body of the fruit adjacent the peel, and means adapted yieldingly to contact the cut face of the half fruit in advance of the movement of the peeling means into the fruit whereby to hold the half fruit from tilting with respect to the first mentioned holding means.

17. In an apparatus for cutting half fruit, the combination of a cup-shaped holder adapted to receive the half fruit and substantially to embrace the curved walls thereof, fruit holding means having a resiliently mounted, substantially flat face adapted yieldingly to contact the flat or cut face of the half fruit and substantially to enclose the half fruit between the cup-shaped holder and the holding means, and cutting means movable to cut into the body of the half fruit while the half fruit is held resiliently between the holding means and the cup.

18. In a fruit treating apparatus, means for supporting a half fruit with its cut face exposed, fruit holding means comprising a hollow stem, supporting means therefor and relative to which said stem reciprocates, means yieldingly urging said stem to one of the limits of its path of reciprocation, a pad on one end of said stem adapted to press against the cut face of the half fruit, said pad having a recess therein, a second stem reciprocally disposed relatively to said hollow stem and having a knock-out pad adapted to press against the cut face of the half fruit, said knock-out pad being adapted to be seated in said recess, means yieldingly urging said knock-out pad out of said recess, cutting means carried by said supporting means and adapted to contact the cut face of the half fruit when said pads are in contact with the cut face of the half fruit, and means for actuating the cutting means while said pads are in contact with the cut face of the fruit whereby to cut the half fruit.

19. In a device of the class described, the combination of means for holding a half fruit with its cut face exposed, a vertically movable cutter support, power means for moving the cutter support toward and from the held half fruit, cutting means mounted on said cutter support and adapted to contact the cut face of the half fruit in one of the positions of the cutter support, complemental fruit holding means mounted on said cutter support, and means actuated solely by spring pressure for causing said complemental holding means to contact the cut face of the half fruit on opposite sides of the center thereof and whereby resiliently to hold the fruit in the first mentioned holding means for the cutting operation.

20. In a fruit holding and cutting machine the combination of a support, a source of power associated with said support, a fruit holder mounted on said support and adapted to engage the curved walls of a half fruit to hold the same, a cutter head shiftable on said support toward and from the fruit holder, power actuated means connected with the source of power for shifting said cutter head to position the same adjacent the cut face of a half fruit while so held and for positioning the cutter head remotely therefrom, cutting means mounted on said cutter head for movement with said cutter head to a position adjacent the cut face of the half fruit while so held, means actuated by said source of power and connected to the cutter on said cutter head for actuating said cutter to cause the cutter to cut into the cut face of the half fruit and through the flesh of the half fruit, and complemental holding means mounted on said cutter head and resiliently shiftable with respect to said cutter head for yieldingly engaging the cut face of the half fruit during at least a portion of the cutting operation, whereby to hold the half fruit from angular turning movement with respect to the first mentioned holding means.

21. In a device for holding and cutting half fruit the combination of a stationary support, a source of power thereon, fruit holding means having a curved wall stationarily mounted with respect to said support for engaging the curved surface of the half fruit for supporting the same, a cutter head shiftably mounted on said support, means connected to said source of power for shifting said cutter head in a path at right angles to the cut face of the half fruit to a cutting position adjacent the cut face of the half fruit and to a position removed from the cut face of the half fruit, a cutter shiftably mounted on said cutter head and adapted to be positioned adjacent the cut face of the half fruit in the first mentioned position of the cutter head, additional means connected to said source of power and to said cutter for actuating said cutter when said cutter is positioned adjacent the cut face of the half fruit, whereby to cause the cutter to cut into the face of the half fruit and through the flesh thereof, and complemental fruit holding means shiftably mounted on said cutter head and adapted automatically to engage the cut face of the half fruit when said cutter head is positioned adjacent the half fruit, whereby to adjustably position the half fruit with respect to the first mentioned holding means, said mounting means for said complemental fruit holding means being constructed and arranged to yield with respect to said cutter head and to the cut face of the half fruit to compensate for various sizes of half fruit, and whereby to maintain the half fruit in position during at least a portion of the cutting operation.

22. In a device for holding and cutting half fruit, the combination of a stationary support, a source of power thereon, fruit holding means having a curved wall stationarily mounted with respect to said support for engaging the curved surface of the half fruit for supporting the same, a cutter head shiftably mounted on said support, means connected to said source of power for shifting said cutter head in a path at right angles to the cut face of the half fruit to a cutting position adjacent the cut face of the half fruit and to a position removed from the cut face of the half fruit, a cutter shiftably mounted on said cutter head and adapted to be positioned adjacent the cut face of the half fruit in the first mentioned position of the cutter head, additional means connected to said source of power and to said cutter for actuating said cutter when said cutter is positioned adjacent the cut face of the half fruit, whereby to cause the cutter to cut into the face of the half fruit and through the flesh thereof, complemental fruit holding means shiftably mounted on said cutter head and adapted automatically to engage the cut face of the half fruit when said cutter head is positioned adjacent the half fruit, whereby to adjustably position the half fruit with respect to the first mentioned holding means, said mounting means for said complemental fruit holding means being constructed and arranged to yield with respect to said cutter head and to the cut face of the half fruit to compensate for various sizes of half fruit, and whereby to maintain the half fruit in position during at least a portion of the cutting operation, and additional yieldably mounted complemental fruit holding means carried by said cutter head for engaging the cut face of the half fruit, said additional complemental fruit holding means being solely operable by spring pressure.

23. In a device of the class described, the combination of means forming a stationary support, a source of power mounted on said support, a turret on said support and adapted to shift in a horizontal plane, means connected with said source of power for intermittently rotating said turret, a plurality of fruit holders stationarily mounted on said turret, each of said fruit holders including a curved surface adapted to engage the curved surface of a half fruit to hold the same, a slide mounted on said stationary support and shiftable in a vertical plane toward and from each cup as the cups are successively brought to a cutting station, means associated with said source of power for shifting said slide, a cutter head carried by said slide, a cutter shiftably mounted on said head, additional means connecting said source of power and said cutter for power actuating the cutter when said cutter head has been positioned adjacent the cut face of the half fruit, and complemental fruit holding means mounted on said cutter head and adapted to engage the cut face of the half fruit when said cutter head is positioned adjacent the half fruit, said complemental fruit holding means being yieldingly shiftable with respect to said cutter head.

24. In a device of the class described, the combination of means forming a stationary support, a source of power mounted on said support, a turret on said support and adapted to shift in a horizontal plane, means connected with said source of power for intermittently rotating said turret, a plurality of fruit holders stationarily mounted on said turret, each of said fruit holders including a curved surface adapted to engage the curved surface of a half fruit to hold the same, a slide mounted on said stationary support and shiftable in a vertical plane toward and from each cup as the cups are successively brought to a cutting station, means associated with said source of power for shifting said slide, a cutter head carried by said slide, a cutter shiftably mounted on said head, additional means connecting said source of power and said cutter for power actuating the cutter when said cutter head has been positioned adjacent the cut face of the half fruit, complemental fruit holding means mounted on said cutter head and adapted to engage the cut face of the half fruit when said cutter head is positioned adjacent the half fruit, said complemental fruit holding means being shiftably mounted with respect to said cutter head, and spring means disposed between said cutter head and said complemental fruit holding means and forming a yielding mounting for said complemental fruit holding means and forming the sole means for producing relative movement between said complemental fruit holding means and said cutter head on contact of the complemental fruit holding means with the cut face of the half fruit.

25. Fruit treating apparatus comprising means engaging the convex portion of a half fruit for holding it during cutting, cutting means, means for moving the cutting means through the flesh of a half fruit starting at the flat cut face of the fruit and ending at the flat cut face of the fruit, and means engaging the flat cut face of the half fruit during cutting, said latter means including mechanism permitting the relative shifting of said means to the first mentioned holding means during the cutting movement.

26. A fruit treating machine comprising a cup for holding a half fruit, a peeling mechanism comprising a reciprocable base, means for moving said cup in a path angularly disposed with respect to the path of movement of the base, a peeling blade journaled in said base for movement through said cup, a fruit holding pad on said base, means urging said fruit holding pad towards said cup when in registration therewith, a discharge pad seated within said fruit holding pad, means normally urging the discharge pad from its seated position towards said cup, said urging means possessing less force than the fruit holding pad urging means, means for moving said base towards said cup when said holding pad is in registry with said cup, the half fruit in said cup being adapted to contact and seat said discharge pad in said holding pad as said fruit holding pad approaches said cup, and means for moving said blade through said cup when said fruit holding pad and said cup are in registry.

27. In combination, a cup, a support movable toward and away from said cup, a fruit holding pad, a pivotal connecting means between said support and pad and arranged transversely of said pad, a knock-out pad reciprocal in said support and substantially concentric of said fruit holding pad, and means for moving said fruit holding pad in parallelism with the path of movement of said support and independent of the angular position of said fruit holding pad relatively thereto.

28. In combination, a frame having a vertical yoke track, a turret mounted in said frame on a vertical axis, a series of open sided cups on said turret, a yoke in said track movable at an angle to the path of travel of the cups on the turret, a peeling blade on said yoke and rotatable thereon about a horizontal axis, a fruit holding pad and a fruit discharge pad yieldingly mounted on said yoke, means for imparting intermittent movement to said turret, means for moving said yoke to register said fruit holding pad with successive cups on said turret, the fruit holding pad and the discharge pad in said base closing the open side of said cup, and means for actuating said knife when a cup is in registry with said fruit holding pad.

29. In combination, a plurality of fruit holding means adapted to hold a half fruit therebetween, one of said means contacting the cut face of the half fruit, means for cutting the fruit while so held, said means contacting the cut face being tiltable while holding the fruit to accommodate small variations in dimensions of the fruit.

30. In combination, a plurality of fruit holding means having means embracing the curved outer walls of the half fruit for holding the half fruit therebetween, additional holding means directly engaging the cut face of the half fruit to confine it between the plurality of means and the additional means, means for cutting the fruit while so held, and means providing a yielding and angularly adjustable movement for said additional holding means while engaging the fruit.

31. In combination, fruit holding means and relatively movable complemental fruit holding means including a plurality of fruit contacting members, mechanical means for moving said members into and out of contact with the fruit to hold the same, including means for withdrawing one of said members from the fruit before the other, and means for cutting the fruit.

32. In combination, fruit holding means including relatively movable complemental fruit holding members, mechanical means for shifting said members into contact with the fruit in a common plane, one of said members having a fruit contacting surface of relatively smaller superficial area than the other and adapted to lie when in said common plane wholly within the marginal confines of the other, and mechanical means for withdrawing said members from the fruit including means for withdrawing the member of larger superficial area from contact with the fruit while leaving the other in contact with the fruit.

33. In combination, means for holding a half fruit, said means embracing curved portions of the fruit, flat-faced means adapted to be mechanically shifted to contact plane surfaces of the fruit, said flat-faced means including a plurality of relatively movable members, means for normally maintaining one of said flat-faced members out of the plane of the other of said members and including means for permitting the movement of said member into substantially the plane of the other flat-faced member and to there remain during the fruit cutting action, and means for cutting the fruit while said members engage the fruit.

34. In a device for cutting half fruit, the combination of means adapted to contact the curved walls of the half fruit to hold it, a power actuated support shiftable a fixed distance toward and from the half fruit holding means, cutting means carried by said shiftable support and movable relative to the support to cut into the body of the half fruit while the half fruit is held in said holding means, means adapted to contact the cut face of the half fruit on opposite sides of the center thereof during the cutting operation, and means for resiliently mounting the said contacting means on said shiftable support for relative movement oppositely to the movement of the support when said contacting means contacts the fruit to accommodate fruit halves of different thicknesses and whereby yieldingly to hold the half fruit from angularly turning relatively to the first mentioned holding means.

35. In a half fruit treating device, the combination of a turret having spaced fruit cups thereon, each fruit cup having curved inner walls substantially coextensive with the entire outer curved surface of the half fruit, means for intermittently rotating said turret to carry each fruit cup to a peeling station, fruit peeling mechanism at said station and shiftably mounted for movement toward the half fruit in a cup at the peeling station, said peeling mechanism comprising an arcuate blade, and power actuated mechanism including means for moving said mechanism toward said cup to place said blade in contact with the cut face of the half fruit and including means for thereafter arcuately moving said blade within said cup adjacent the inner walls thereof to peel the half fruit.

MARK EWALD.